Aug. 8, 1950     G. A. ZABRISKIE, III., ET AL     2,517,756
METHOD OF MAKING ICE CREAM LAYER CAKE
Filed Jan. 25, 1950
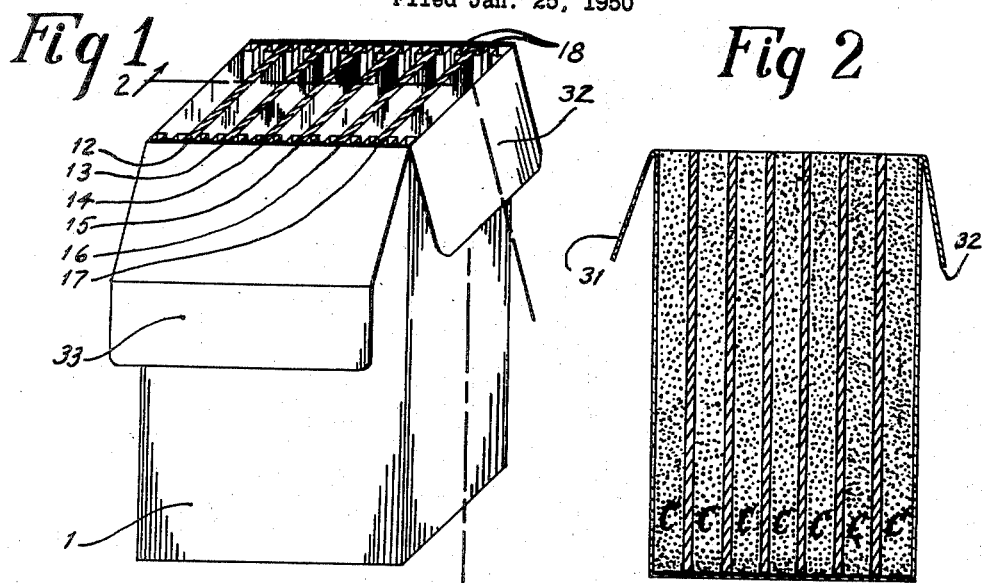
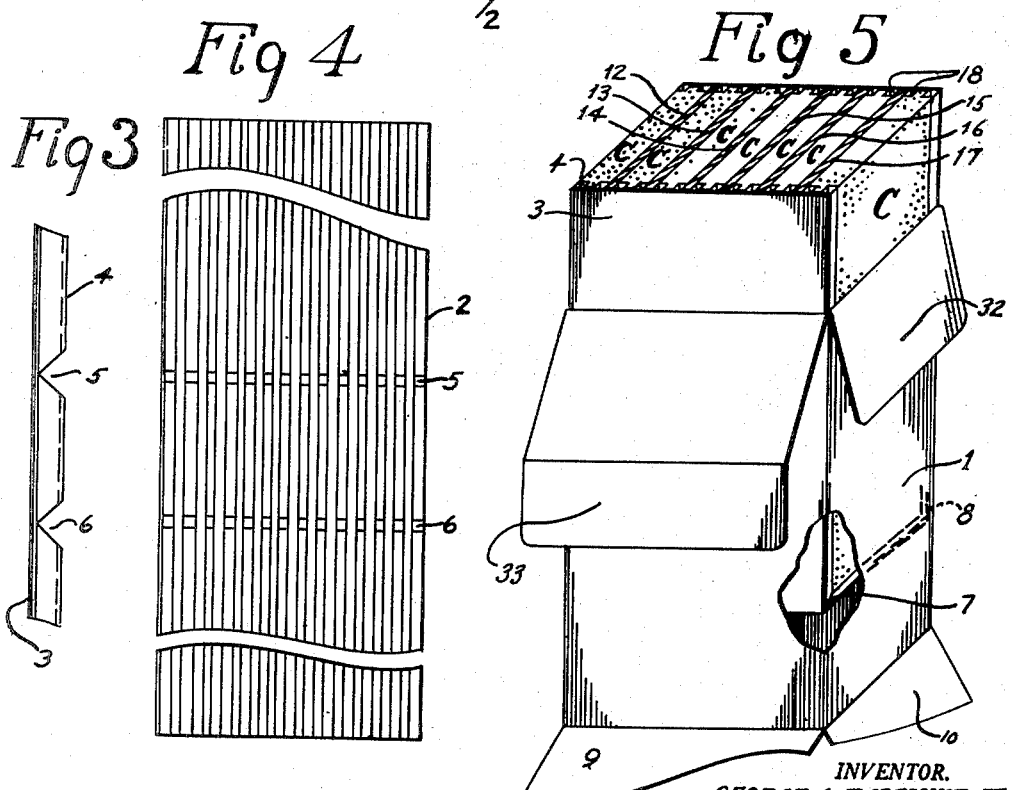
INVENTOR.
GEORGE A. ZABRISKIE III
BY FOSDICK ZABRISKIE
ATTORNEY Patented Aug. 8, 1950

2,517,756

UNITED STATES PATENT OFFICE 2,517,756

METHOD OF MAKING ICE CREAM LAYER CAKE

George A. Zabriskie, III, New York, and Fosdick Zabriskie, Brooklyn, N. Y., assignors to Airline Foods Corp., Manhattan, N. Y., a corporation of Delaware Application January 25, 1950, Serial No. 140,406

7 Claims. (Cl. 99—180)

This invention relates to frozen confections. In particular, it is directed to an ice cream layer cake, and especially the method of producing the same in large scale production, and the package produced by such method.

Although ice box cake has been known for a long time, its preparation has been confined to the household or the bake shop as a custom-made article. Ice box cake consists of a lamination of cake or biscuits and whipped cream, all of which is subjected to refrigeration. The time and labor involved in the preparation of this product are such that this confection has not been placed on the market by large scale producers of frozen confections. The substitution of ice cream for whipped cream has entailed additional difficulties in preparing a frozen confection similar to ice box cake by the large commercial manufacturers of ice cream. Although ice cream manufacturers have for many years desired to make available to the consuming public an ice cream layer cake, similar to ice box cake, at a reasonable price it has been regarded as impossible to provide such a product at non-luxury prices. It has been found extremely difficult to provide a method of manufacturing an ice cream layer cake by line production methods. All attempts heretofore made to produce such a product have been based upon manual placement of the cake filling between slabs of ice cream. Heretofore there has never been any method available by which ice cream layer cake can be manufactured at high speed by line production methods.

Accordingly, it is among the principal objects of this invention to provide a process which permits the rapid and economical production of an ice cream layer cake in a simple manner.

A further object of this invention is to provide a novel means of producing an ice cream layer cake consisting of alternating layers of ice cream and biscuits.

A further object of this invention is to produce an ice cream cake in which the layers are of uniform thickness, thereby providing a product having great consumer appeal and available commercially at relatively low cost.

Another object of this invention is to provide an exceedingly economical means for accomplishing the production of such an ice cream cake.

A still further object of this invention is to produce a packaged ice cream layer that may be readily removed from the container and easily divided into servings of desired size.

The foregoing objects, as well as other objects and advantages of this invention, will become more apparent from the following detailed description thereof taken in conjunction with the accompanying drawings wherein:

Fig. 1 is a perspective view of a container with the top flaps thereof open disclosing the assembly of the package and means of positioning the biscuits before the ice cream, in the fluid state, is poured into the container.

Fig. 2 is a sectional view of the container shown in Fig. 1 after being filled with ice cream, the section being taken on the line 2—2 thereof.

Fig. 3 is a side view of a fragmentary piece of single-faced corrugated paper board employed to hold the biscuits in position within the container, said fragmentary piece being "scored" across the corrugations so that the piece may be folded at right angles in two places, thereby to form the bottom and sides of the liner of the package.

Fig. 4 is a plan view of the corrugated paper board liner laid flat, and showing the transverse scoring that permits the same to be folded properly.

Fig. 5 is a perspective view of an ice cream layer cake made in accordance with this invention shown partially pushed out of the container within which it was formed.

In carrying out the method of this invention, we start with a container 1 of paper or other appropriate material, and insert thereinto a liner, as for example, one made of corrugated paper board 2 consisting of a sheet of backing 3 and a corrugated sheet 4 adhered thereto, the corrugated sheet 4 having previously been scored as at 5 and 6 whereby the corrugated board is folded at right angles so that the piece has a profile similar to a U provided, however, with corners as at 7 and 8. The container 1 is closed at the bottom, the flaps 9 and 10 forming said bottom, being appropriately made to adhere to each other. After the liner is inserted in the container 1 a plurality of biscuits, for example, the biscuits as at 12, 13, 14, 15, 16 and 17 are inserted therein, being held laterally separated from each other by the corrugations or flutings 18. The thickness of the biscuits may be equal to, or preferably slightly less than, the distance between the corrugations, or more technically, the thickness of the biscuits is equal to, or preferably slightly less than, one-half "wave length" of the corrugations or flutings. The biscuits are preferably made of a relatively rigid cake so as to facilitate the introduction thereof into the container.

The container, so filled with the biscuits, may then be filled with ice cream C. in the fluid state. The liner may be provided with holes, if desired, to permit of the more rapid displacement of the air, and thus to prevent the formation of air pockets when the filling is done at high speed.

After the container is filled, the top flaps 31, 32 and 33 may be closed, and the filled container then sent to the hardening room. When hardened the container may be distributed in the fashion customary to the distribution of "brick" ice cream. When the filled container is delivered to the consumer, the top and bottom flaps thereof may be opened in the customary fashion, and the ice cream cake brick pushed out from the container as shown in Fig. 5. After removal from the container the liner may be peeled from the ice cream cake brick, after which the same may be cut into any appropriate number of servings.

It will be understood, of course, that the containers, into which the liners have been inserted, may be placed on a conveyer belt, "loaded" with the biscuits, and then filled with ice cream in the fluid or plastic state by appropriate automatic devices. This system thus provides, for the first time, the means for the rapid, economical, and sanitary production of ice cream layer cake.

It will be noticed that, in one of its principal aspects, this invention involves the provision of a container of paper or other appropriate material, provided with means for engaging a plurality of spaced-apart biscuits or the like so as to form a plurality of compartments in the container; that these compartments are then filled with ice cream in the fluid state; and after that operation the filled container is sent to the hardening room. The means for engaging the biscuits within the container so as to provide a plurality of compartments may be provided by a separate unit such as a liner which is hereinabove described, or by an appropriate form of construction.

It will be manifest that this unique provision of means for holding the biscuits in the container makes it possible rapidly to load the same with the biscuits maintained in the predetermined spaced-apart relationship, after which the compartmentized containers may be rapidly passed to an appropriate filling station, and thence to the hardening room. When hardened the unitary frozen product resembles, in general outline, the familiar ice cream brick, but it differs therefrom in the fact that the biscuits, or other appropriate baked goods, are frozen into the same, and form an integral part thereof. By this invention, ice cream layer cake and the like may now be produced at tremendous savings in labor costs so that this confection is no longer to be regarded only as a custom-made product and available only at luxury prices.

It will be understood that the foregoing description of this invention and the particular embodiment shown in the drawing is merely illustrative of the principles of this invention; and accordingly the appended claims are to be construed as defining the invention within the full spirit and scope thereof.

We claim:

1. A process of preparing a frozen confection which comprises providing a container with means for engaging a plurality of biscuits in spaced-apart relationship thereby to form a plurality of compartments in said container, positioning a plurality of biscuits therein to form said compartments, filling the container with a fluid confection, and then freezing the so-filled container thereby to obtain a frozen confection.

2. A process of preparing a frozen confection which comprises providing a disposable container with means for engaging a plurality of biscuits in spaced-apart relationship thereby to form a plurality of compartments in said container, positioning a plurality of biscuits therein to form said compartments, filling the container with a fluid confection, and freezing the so-filled container thereby to obtain a frozen confection surrounded by the disposable shell of the container.

3. A process of preparing a frozen confection which comprises placing in a container a liner having means for engaging a plurality of biscuits in spaced-apart relationship thereby to form a plurality of compartments in said container, positioning a plurality of biscuits therein to form said compartments, filling the container with a confection in the fluid state, and then freezing the so-filled container.

4. A process of preparing a frozen confection which comprises placing in a disposable container a liner having means for engaging a plurality of biscuits in spaced-apart relationship thereby to form a plurality of compartments between pairs of said biscuits and a compartment between a biscuit and a wall of said container, filling the container with a confection in the fluid state, and then freezing the so-filled container thereby to obtain a frozen confection surrounded by the disposable shell of the container.

5. A process of preparing a frozen confection which comprises placing in a container, a liner having walls provided with corrugations facing each other, inserting a plurality of biscuits in said liner, the said biscuits being held in engagement by a pair of corrugations, thereby to form a plurality of compartments within said container, filling said container with fluid confection, and then freezing the so-filled container, thereby to obtain a frozen confection.

6. Method of preparing a frozen confection which comprises placing in a container a liner formed of a corrugated board cut and folded so as to provide a pair of spaced-apart walls, inserting biscuits within said container, the edges of said biscuits being held in engagement by the corrugations of said liner, thereby to form a plurality of compartments in said container, filling said container with a fluid confection, and then hardening the same thereby to obtain a frozen confection.

7. A method of making an ice cream layer cake which comprises placing in a container a liner provided with spaced-apart means for engaging a plurality of biscuits, thereby to form a plurality of compartments in said container, inserting biscuits in the said engaging means, filling the compartments with ice cream, and then hardening the said ice cream, thereby to form an ice cream layer cake.

FOSDICK ZABRISKIE.
GEORGE A. ZABRISKIE, III.

REFERENCES CITED

The following references are of record in the file of this patent:

UNITED STATES PATENTS

| Number | Name | Date |
|---|---|---|
| Re. 19,153 | Battista | May 1, 1934 |
| 1,731,721 | McGowan | Oct. 15, 1929 |
| 2,429,353 | Gibson, Sr. | Oct. 21, 1947 |